United States Patent [19]

Vaughn

[11] Patent Number: 4,924,848
[45] Date of Patent: May 15, 1990

[54] HIGH-EFFICIENCY FURNACE FOR MOBILE HOMES

[75] Inventor: Thomas D. Vaughn, Ballwin, Mo.

[73] Assignee: Nordyne, Inc., St. Louis, Mo.

[21] Appl. No.: 396,231

[22] Filed: Aug. 21, 1989

[51] Int. Cl.⁵ .............................................. F24H 3/02
[52] U.S. Cl. .......................... 126/110 AA; 126/116 R
[58] Field of Search ........ 126/110 R, 110 AA, 116 R

[56] References Cited

U.S. PATENT DOCUMENTS

| | | | |
|---|---|---|---|
| 2,923,287 | 2/1960 | Murphy | 126/110 R |
| 3,171,400 | 3/1965 | Heiman | |
| 3,223,078 | 12/1965 | Miller et al. | 126/110 R |
| 3,601,116 | 8/1972 | Davis | |
| 4,164,210 | 8/1979 | Hollowell | |
| 4,256,082 | 3/1981 | Scholten | |
| 4,409,955 | 10/1983 | Christian | |
| 4,478,206 | 10/1984 | Ahn | |
| 4,515,145 | 5/1985 | Tallman | |
| 4,621,686 | 11/1986 | Ahn | |

Primary Examiner—Carroll B. Dority
Attorney, Agent, or Firm—Jerome A. Gross

[57] ABSTRACT

A furnace utilizing, in the upper portion of its cabinet, a blower acting downward through a separator opening to circulate room air past a combustion chamber whose gases flow upward through a sideward-positioned board radiator member which reaches up to the flue. A substantial increase in efficiency results from drawing the combustion gases out of the combustion chamber at the side opposite to the lower end of the broad radiator member, and interposing therebetween, directly beneath the separator opening, a plurality of tubes which serve as an intermediate heat exchanger. A still greater increase in efficiency is achieved by utilizing, instead, a finned tube heat exchanger across and beneath said separator opening; its heat transfer may be so great as to result in condensation of water vapor in the combustion gas. To purge this, a motorized inducer-blower is used in the inlet air system, driving the condensate through the finned tube heat exchanger to an appropriate drain.

10 Claims, 3 Drawing Sheets

HIGH-EFFICIENCY FURNACE FOR MOBILE HOMES

BACKGROUND OF THE INVENTION

1. Field of the Invention

This invention relates to small down-flow furnaces whose combustion gases are vented upward through a broad, radiator member curving inward to a flue.

2. Related Art

Down-flow furnaces, in which room air is delivered downward over heat-exchanger surfaces, have been used for many years, especially in mobile homes which utilize the balanced draft afforded by concentric flues. The room air is conventionally directed over a combustion chamber mounted in the lower part of a furnace cabinet, which serves as the primary heat exchanger. Heated air is discharged through a system of floor ducts. See for example U.S. Pat. Nos. 3,171,400, and 3,601,116. As shown in those patents, it is conventional to permit the upflow of combustion gases to the flue through a broad radiator member curved around the centrifugal blower; this radiator member serves as the final heat exchanger. The gas from the upper part of the combustion chamber is ducted to the radiator member by a short cylindrical flue connector.

In order to achieve much greater efficiency in the utilization of the fuel, much more complex furnaces have been designed, such as shown in U.S. Pat. No. 4,621,686, issued Nov. 11, 1986; these extract even the latent heat of condensation of combustion gases. That patent shows a finned heat exchanger positioned on a slant beneath the outlet of a centrifugal blower. A suction fan draws the gases downward, through the heat exchanger, removes the condensate, and expels the combustion. Such high-efficiency furnaces are costly to manufacture and have not proved to be popular.

SUMMARY OF THE INVENTION

The principal purpose of the present invention is to achieve a substantial increase in fuel efficiency over the simple furnace type, first referred to, at a modest increase in cost.

U.S. Pat. No. 3,171,400 shows what is believed to be the accepted practice -- using the shortest feasible flue connector from the combustion chamber, which serves as the primary heat exchanger, to the upward-leading curved radiator member. Instead, in the present invention the combustion gases leave the combustion chamber at its side opposite to the gas transfer member, and flow to the lower end of the radiator member through an intermediate heat exchanger positioned substantially horizontally directly beneath the outlet of the centrifugal blower. This added heat exchanger, so positioned, increases substantially the efficiency of fuel utilization, depending in part on whether a simple plurality of parallel tubes is used or whether this intermediate heat exchanger is a finned one.

The walls of the lower heating compartment through which the down-flow room air passes around the combustion chamber, must be fairly close to it to effect heat exchange from it. When the outlet of the centrifugal blower is centered above the combustion chamber, the size of the centrifugal blower may require it to project somewhat forwardly of this lower heating compartment, as shown in U.S. Pat. No. 3,171,400. If now a concentric flue is employed to draw the inlet air in an annulus outward of the flue for combustion gas, a saving of cabinet space is effected by drawing the inlet air forward just beneath the top of the furnace cabinet, and thence down in front of the forward wall of the lower heating compartment portion and thence into the front of the combustion chamber. By employing a downward-leading air delivery tube of circular cross-section, the draft so furnished is superior to that of inlet air supplied through relatively flat passages, as have heretofore conventionally been employed, especially those passages leading down through the interior of the heating compartment.

The utilization of such exterior supply of inlet air also simplifies construction where a draft-inducing and supplementary fan, sometimes called an inducer fan, is utilized. Since thermostatically-controlled furnaces operate intermittently, there is no natural draft until combustion has begun, so an induced draft may be required. Further, using a hydrocarbon fuel, the temperature of the combustion gas may be so reduced in the heat exchangers as to precipitate water, especially on start-up when the surfaces are cold. To clear this precipitate from narrow heat-exchange tubes, forced draft may be needed. Therefore, use of an inducer fan is especially important where, in order to obtain further increased efficiency, the intermediate heat exchanger is of finned tube construction. In practicing the present invention such an inducer fan is positioned at the lower end of the exterior downward air delivery tube, to cause air from it to flow sideward and then inward into the combustion chamber.

Whether this intermediate heat exchanger consists of simple tubes or finned tubes, the present furnace is unique in its use of three heat exchanger units: the combustion chamber walls, the new intermediate tubular heat exchanger, and the broad radiator which leads the combustion gases to the flue.

BRIEF DESCRIPTION OF THE DRAWINGS

FIG. 7 is a fragmentary view generally corresponding to the lower right portion of FIG. 1, showing an alternate inducer fan installation.

FIG. 8 is a fragmentary view generally corresponding to the lower right portion of FIG. 2, showing such alternate installation.

DESCRIPTION OF THE PREFERRED EMBODIMENTS

Figure 1:
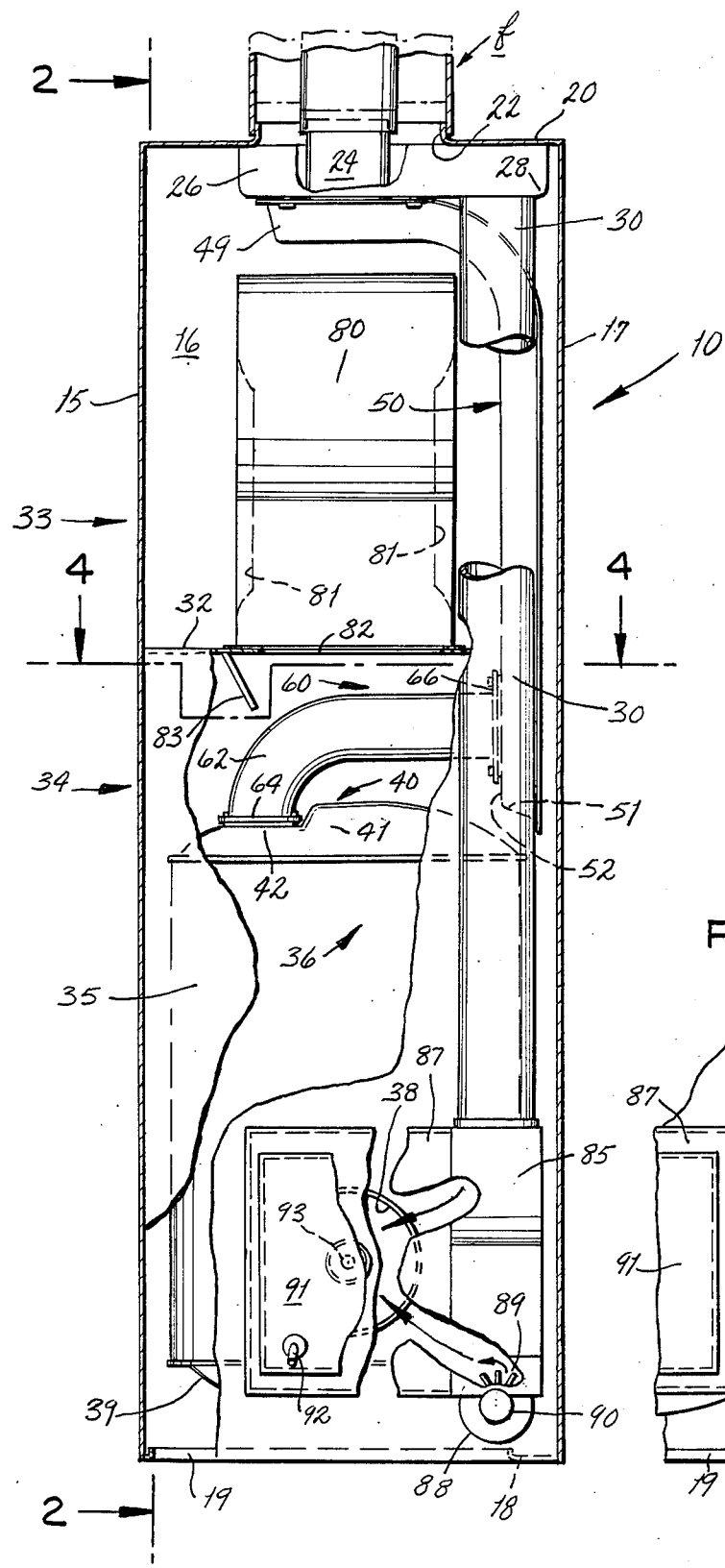
FIG. 1 is a front view of a furnace embodying the present invention, shown with its door removed and having a removable concentric flue at its top, the view being broken away at right to show portions behind the vertical air supply conduit, and broken away below to show the combustion chamber and the air supply to it.
Figure 2:
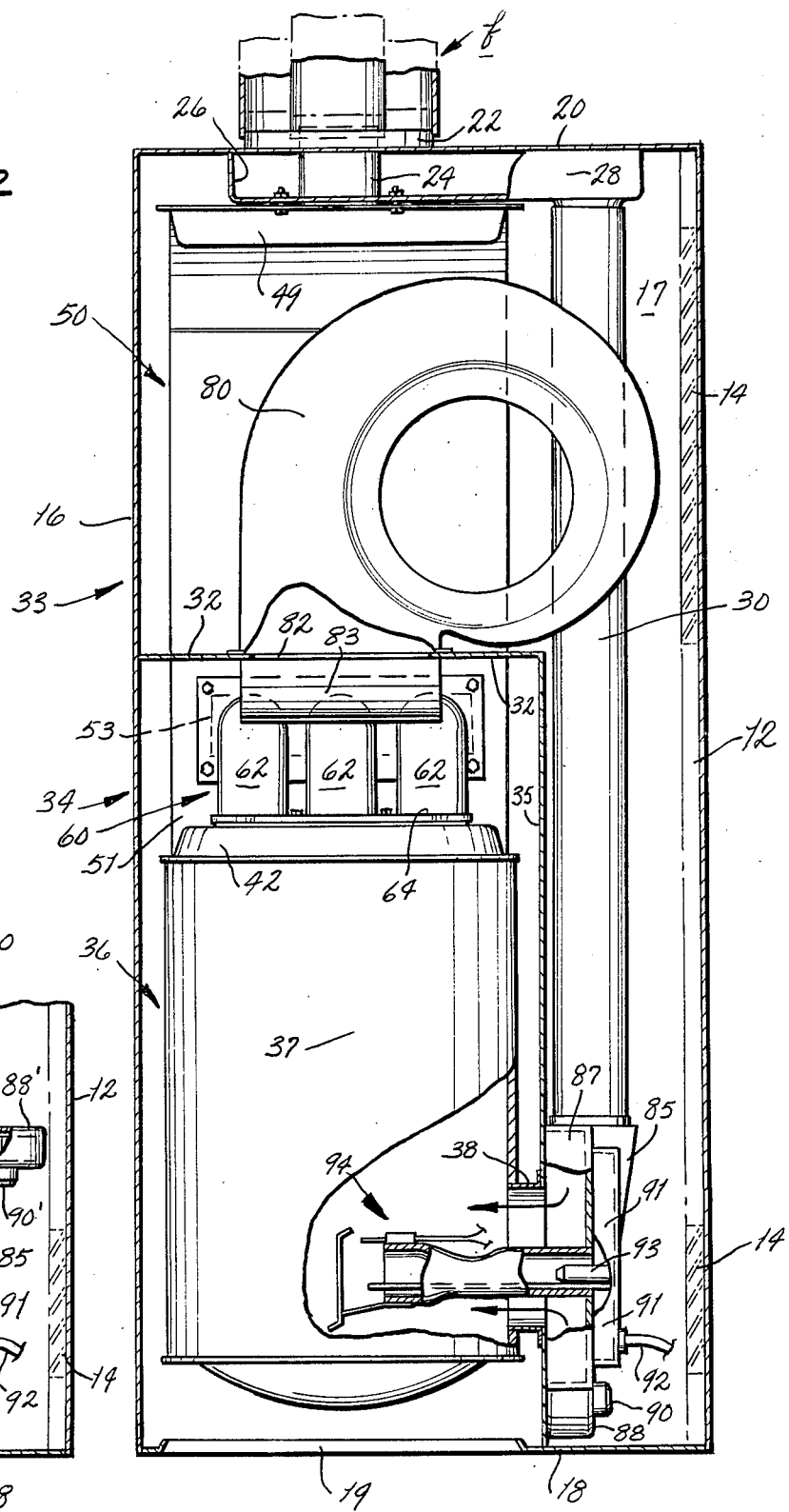
FIG. 2 is a left side view taken along line 2—2 of FIG. 1 showing a louvered furnace door in place, and broken away to show the air supply from the lower end of the vertical conduit to a conventional gas burner.

The furnace of the present invention includes a downflow cabinet generally designated 10, seen in the front view FIG. 1 with its louvered door removed. The left side sectional view FIG. 2 shows the louvered door 12 in place with room air inlet louvers 14 opposite the upper portion of the downflow cabinet 10. The cabinet 10 has a left wall 15, a rear wall 16 and a right wall 17. At its base is a narrow structural base flange 18, which provides an outlet 19 for heated air.

Figure 3:
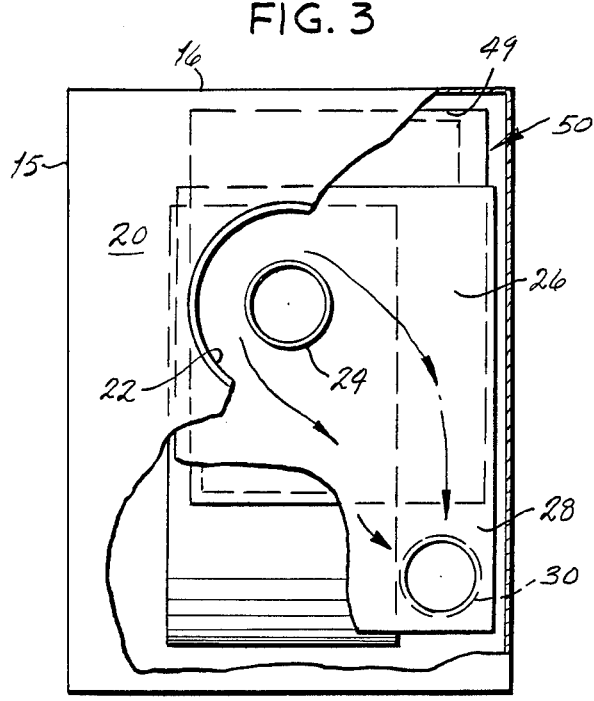
FIG. 3 is a top view broken away to show the horizontal transverse plenum having an annular inlet from which the air flows forwardly to the vertical air supply conduit.

The cabinet top wall 20 shown in FIGS. 1, 2 and 3 has an outer upstanding circular flange 22 spacedly surrounding an inner concentric flue collar connector 24 which serves as the outlet for the horizontal upper end portion 49 of a substantially conventional radiator member generally designated 50, hereinafter described.

Shown in FIGS. 1 and 2 as removably secured to the outer flange 22 and collar connector 24 are the lower end portions of a conventional concentric flue generally designated f, not part of the present invention, and removable upwardly as shown in phantom lines.

The annular space between the inner concentric connector collar 24 and the outer circular flange 22 serves as an annular inlet to a transverse plenum box 26, of which the cabinet top wall serves as a part. The plenum box 26 has a forward overhang portion 28 which, as seen in FIG. 1, extends farther forwardly than any of the other upper components, to provide inflow air communication to a downward leading air conduit 30 seen at the right in FIGS. 1-4.

Figure 5:
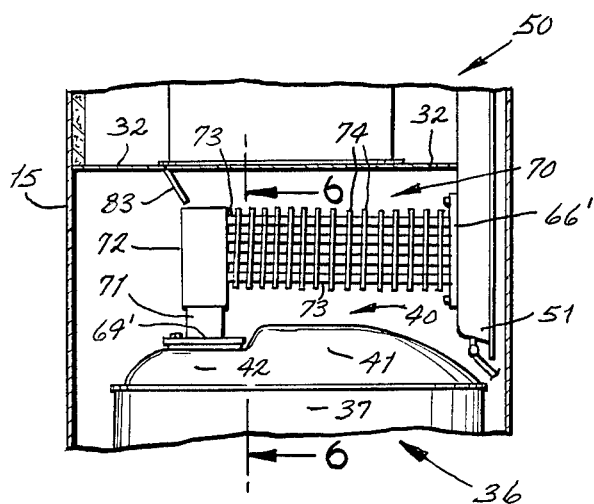
FIG. 5 is a fragmentary elevation corresponding to the mid-portion of FIG. 1, of an alternate finned tube heat exchanger unit installed between the combustion chamber and the radiator.

Referring now to the other furnace cabinet portions, a horizontal separator shelf 32, best seen in FIGS. 1, 2 and 5, divides the cabinet 10 into an upper cabinet portion generally designated 33 and a lower cabinet portion generally designated 34, the latter enclosed beneath a separator shelf 32 by a lower forward cabinet wall 35 seen in FIG. 2 and broken away in FIG. 1. It is to be understood that all walls of the lower cabinet portion 34 are insulated in a conventional manner, which insulation is not here shown.

Supported upwardly from the structural base flange 18 and spacedly within the walls of the lower cabinet portion 34 is a heavy steel furnace combustion chamber generally designated 36. Its support may be by conventional means secured to the said walls such as vertically positioned angle brackets, not shown. The combustion chamber 36 may have a substantially cylindrical vertical side wall 37 penetrated near its lower edge by a large circular horizontal inlet flange 38, best seen in FIGS. 2 and 4. The combustion chamber 36 is completed by a bottom wall 39, which may be domed as shown, and a top wall generally designated 40 whose configuration is best seen in FIG. 1. Describing that configuration, it has a generally domed shape rising to a maximum height in its right side portion 41 seen in FIG. 1, but whose left top wall portion 42 rises to a plane.

Reverting to the radiator member generally designated 50 whose horizontal upper end portion 49 has heretofore been described: the radiator member 50 is substantially conventional, save for its positioning along the right side wall 17 of the cabinet 10, where it extends from a lower end portion 51, substantially at the height of the domed top wall 40 of the combustion chamber 36, through and beyond the horizontal separator shelf 32, and then curving to its horizontal upper end 49, which is bolted to the undersurface of the transverse plenum box 26. The radiator member 50 is, in its conventional form, a slender broad box-like member whose width, best seen in FIG. 2, is substantially the same as that of the combustion chamber 36, occupying the major portion of the width between the lower forward cabinet wall 35 and the rear cabinet wall 16. In conventional installations such a radiator member 50 serves as a second heat exchanger, the walls of the combustion chamber 36 serving as the primary heat exchange surface. Below the level of the separator shelf 32 and immediately above the radiator lower end 51 the inwardly-presented surface 52 of the radiator 50 has a planar inlet opening 53, seen in FIG. 4. A substantially similar planar combustion gas outlet (not shown) is formed in the planar top wall portion 42 of the combustion chamber top 40.

Figure 4:
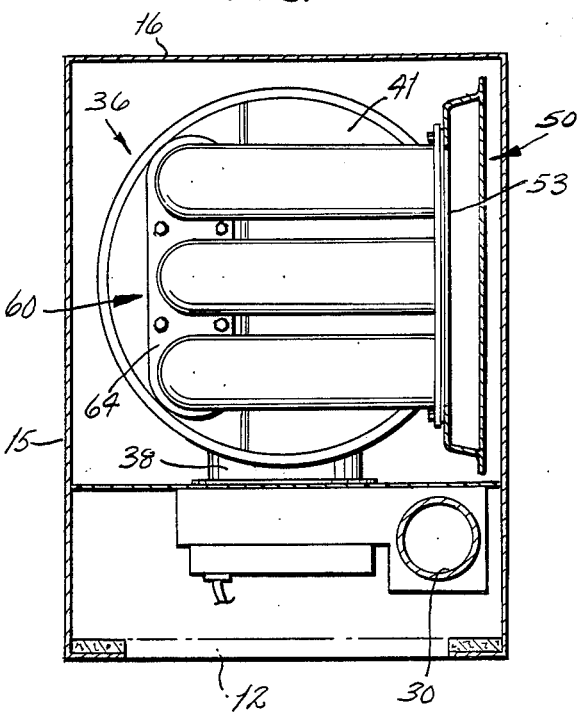
FIG. 4 is a horizontal section taken along line 4—4 of FIG. 1 showing a three-tube heat exchange unit embodying the present invention interposed intermediate between a top outlet of the combustion chamber and leading across, immediately beneath the blower outlet opening, to a conventional radiator member.
Figure 6:
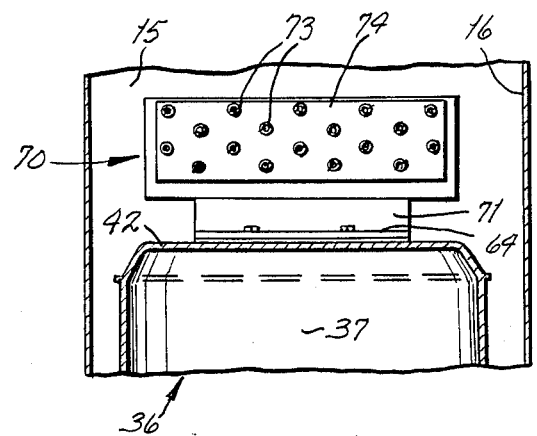
FIG. 6 is a partial sectional view taken along line 6—6 of FIG. 5.

Two alternate forms of intermediate heat exchanger are here shown; a simple multi-tube intermediate exchanger generally designated 60, shown in FIGS. 1, 2 and 4, and a more complex intermediate heat exchanger of the finned tube type 70 which provides even greater heat efficiency, and is shown in FIGS. 5 and 6.

In the simpler embodiment 60, a plurality of tubes 62—as few as two—may be used. Their inlet portions extend upward from an inlet flange plate 64, which is readily bolted about the combustion gas outlet in the top planar portion 42 at the left side of the combustion chamber top wall. The tubes 62 are bent to extend horizontally and terminate in an outlet flange plate 66, bolted to the radiator inner side wall 52 about its inlet opening 53. In another form of intermediate heat exchangers, see FIGS. 5 and 6, an inlet flange plate 64' mounts a rectangular box portion 71 which extends upward to position a fore-and-aft manifold 72 at at a level opposite the lower portion 51 of the radiator 50. Extending from the manifold 72 to an outlet flange plate 66' at a small downward-sloping angle which may be 5°, are a plurality of heat exchange tubes 73 bearing transverse fins 74.

The separator shelf 32 mounts a conventional centrifugal blower 80, seen in FIGS. 1 and 2, which receives room air drawn in through the door louvers 14 through side openings 81 in the blower scroll, to be discharged downwardly. As seen in FIG. 1, the right side opening 81 is adjacent to the radiator member 50 at the right side wall 17 of the upper cabinet portion 33; the adjacency of the radiator member 50 to this side inlet 81 somewhat improves the heat transfer from the radiator 50.

The discharge opening of the blower scroll is positioned to correspond with an opening 82 in the separator 32. The opening 82 is positioned directly above the intermediate tubular heat exchange means 60 or 70, so that room air from the centrifugal blower 80 is directed upon and through said intermediate heat exchange means. Because of space limitations in the cabinet, it is not always possible to locate the flow opening from the blower 80 precisely over such intermediate heat exchange unit; to aid in directing the air thereover, a vane plate 83 may be added, as shown in FIGS. 1, 2 and 5, to direct the air most advantageously.

As compared with prior furnaces whose combustion gas passes directly from combustion chamber to radiator, interposing the simple multi-tube heat exchanger 60 may increase fuel efficiency roughly at least 10%. The finned tube heat exchanger 70 may improve efficiency by roughly 20%, but with this complication: since one of the products of combustion of hydrocarbon gas is water vapor, with increased efficiency this may condense in the relatively small gauge tubes 73, particularly at start-up when the tube walls are cold. The 5° slope of the tubes 73 partly overcomes this problem, as does supplying forced air by an inducer fan 89, now to be described.

The downward inlet air conduit 30 terminates in taperingly narrowed lower end air transfer member 85 which communicates sidewardly to the interior of an air box 87, seen in FIGS. 1 and 2. The air box 87 encloses that portion of the forward compartment wall 35 which leads into the circular inlet flange 38 of the combustion chamber 35. For a forced air supply, in the lower end of the air transfer member 85 there may be incorporated a downward-extending somewhat semi-cylindrical housing 88 enclosing an inducer fan 89, whose blades extend upwardly into the transfer member 85. The fan 89 is powered by an electric motor 90 to rotate on a horizontal axis in the direction shown by the curved arrow of FIG. 1, to induce a draft downward through the air conduit 30 and transversely into the combustion chamber 35.

Alternatively, as seen in FIGS. 7 and 8, such an inducer fan 89' may be accommodated in a housing 88' extending forward from the upper end of the transfer member 85, there mounting a similar motor 90' to rotate on a vertical axis.

Using the finned tube heat exchanger unit 70 of FIGS. 5 and 6, the operation of the inducer fan 89, 89' should not be discontinued immediately after combustion is started, because water vapor is likely to condense in the relatively small gauge tubes 73, at least before they are thoroughly heated by continuing operation. While the 5° slope of the tubes 73 tends to cause condensate to flow to the radiator lower end 51, the pressurized draft afforded by the inducer fan 89 drives the condensate along to the radiator end 51. While a drain 99 may be provided as shown in FIG. 5, with prolonged operation all components reach substantially higher temperatures at which condensation may not be expected to occur. At such higher temperatures any initial condensate may vaporize or at least separate into fine droplets, to be carried upward and discharged with the now hot flue gases.

Even with the simpler intermediate heat exchanger 60, an inducer fan 89 furnishes reliability in starting combustion. When the furnace is cold there is no natural draft; a fan 89 provides insurance against failure at start-up. With such an installation the inducer fan 89 need not operate after combustion has been commenced, thus saving electric current required for continuing operation.

The combustion system shown in the drawings is otherwise conventional. Mounted on the outer side of the air box 87 is a conventional gas valve 91, supplied through a gas supply tube 92, and projecting a conventional gas supply nozzle 93 and burner assembly generally designated 94 through the air box 87 and the combustion chamber inlet flange 38.

It will be apparent that other conventional combustion systems may be utilized, for example, oil burning systems, with substantially the same advantages as herein described.

As various modifications may be made in the constructions herein described and illustrated without departing from the scope of the invention, it is intended that all matter contained in the foregoing description or shown in the accompanying drawings shall be interpreted as illustrative rather than limiting.

What is claimed:

1. A furnace of the type having a generally rectangular cabinet within whose upper surface lies an upwardly presented flue connector for combustion gas,
    said cabinet being divided by separator means into an upper compartment forwardly open to room air and mounting a centrifugal blower acting downward through an opening in said separator means, and a lower cabinet portion housing a combustion chamber positioned spacedly within the cabinet walls, further having a bottom outlet for heated room air,
    a broad combustion gas radiator member extending from an inlet end below said separator means, upward into said upper compartment adjacent to said centrifugal blower and curvedly inward to said flue connector for combustion gas,
    said combustion chamber containing burner means and having a top combustion gas outlet displaced from center of said opening in said separator means to the side thereof opposite to said lower end of said broad radiator member, in combination with
    tubular heat exchange means extending from said combustion chamber top gas outlet, across and beneath said separator opening to communicate combustion gas to the lower end of said broad radiator member,
    whereby for heat exchange, room air may pass over surfaces of said radiator member, through said centrifugal blower and separator opening, over the surfaces of said tubular heat exchange means, and then downward over and around the combustion chamber.

2. A furnace as defined in claim 1 in which
    said combustion chamber has an upright substantially cylindrical wall with top and bottom members joined thereto,
    said top member having a domed portion, whereby to facilitate downward airflow thereover,
    said top member further having a flat portion whereon to seat said tubular heat exchange means.

3. A furnace of the type as described in claim 1, wherein
    said combustion chamber top gas outlet of said chamber is located in a flat portion, and said radiator inlet is located in a flat portion of said radiator, and in which
    said heat exchange means includes at its inlet end a flat flange securable to said combustion chamber top gas outlet and at its outward end a flat flange securable to the inlet end of said combustion gas radiator member.

4. A furnace of the type as described in claim 1, further having
    an inlet air system comprising
    an inlet air transverse plenum in said upper compartment positioned above said blower and having an annular plenum inlet about said flue connector, said transverse plenum extending from said plenum inlet generally forward of said heat exchange means and there having
    an air conduit leading downward to said combustion chamber.

5. A furnace of the type as described in claim 1, wherein said tubular heat exchange means comprises a finned heat exchanger.

6. A furnace of the type as described in claim 1, wherein
said centrifugal blower for room air has a side inlet adjacent to which said broad radiator member is positioned,
whereby to effect heat transfer from said radiator member to room air drawn into said blower inlet.

7. For use with a concentric flue of the type which draws inlet air in an annulus outward of a central combustion gas flue,
a high efficiency furnace adapted to burn hydrocarbon fuel, comprising
a generally rectangular cabinet within whose upper surface lies an upwardly presented flue connector for combustion gas,
said cabinet being divided by separator means into an upper compartment forwardly open to room air and mounting a centrifugal blower acting downward through an opening in said separator means, and a lower cabinet portion housing a combustion chamber positioned spacedly within the cabinet walls, further having a bottom outlet for heated room air,
a broad combustion gas radiator member extending from an inlet end below said separator means, upward into said upper compartment adjacent to said centrifugal blower and curvedly inward to said flue connector for combustion gas, said combustion chamber containing means for burning hydrocarbon fuel and having a top combustion gas outlet displaced, from the center of said opening in said separator means, to the side thereof opposite to said lower end of said broad radiator member,
heat exchange means of the finned tube type extending from said combustion chamber top gas outlet, across and beneath said separator opening and somewhat downward, to communicate combustion gas to the lower end of said broad radiator member, and
means thereat to drain condensate from the gas of combustion of such hydrocarbon fuel, together with
an inlet air system comprising
an inlet air transverse plenum in said upper compartment above said blower and having an annular plenum inlet about said flue connector, said transverse plenum extending from said plenum inlet generally forward of said heat exchanger and there communicating with
an air conduit leading downward to said combustion chamber, said inlet air system further including
electrically operated draft-inducer blower means connected to said air conduit operative while said burner means is operating,
whereby said inducer blower means causes such rate of flow of combustion gas through said finned tube heat exchanger as to drive condensate precipitated therein to said means to drain.

8. A furnace adapted to precipitate water vapor from burned hydrocarbon fuel, comprising
a cabinet having side walls divided by separator means onto an upper and a lower portion, and having in the top wall a flue connector,
a combustion chamber in said lower portion of said cabinet positioned spacedly between the cabinet walls, said combustion chamber containing means for burning hydrocarbon fuel and having in its top and positioned towards one side a combustion gas outlet,
a combustion gas conducting member extending from said lower cabinet portion upward along the side of said cabinet opposite from said combustion gas outlet and thence to said flue connector,
a room air circulating blower so positioned in the upper cabinet portion as to discharge room air through said separator means downwardly substantially centrally between said combustion chamber's gas outlet and the lower end of said gas conducting member, and
heat exchange means of the finned tube type extending between said combustion chamber gas outlet across and beneath the discharge of said blower to said lower end of the said combustion gas conducting member, further having
an inlet air system leading to said combustion chamber and including
electrically operated draft-inducer blower means operative while said burner means is operating,
whereby said inducer blower means causes such rate of flow of combustion gas through said finned tube heat exchanger as to drive condensate precipitated therein to said upward-extending combustion gas conducting member.

9. A furnace as defined in claim 8, the lower end of said upward-extending gas conducting member having means to drain.

10. A furnace as defined in claim 8, in which said finned tube heat exchanger means, in so extending, has a downward slant,
whereby to facilitate flow of condensate therethrough.

* * * * *

UNITED STATES PATENT AND TRADEMARK OFFICE
CERTIFICATE OF CORRECTION

PATENT NO. : 4,924,848

DATED : May 15, 1990

INVENTOR(S) : Vaughn, Thomas D.

It is certified that error appears in the above-identified patent and that said Letters Patent is hereby corrected as shown below: TITLE PAGE:

In the ABSTRACT, fifth line, delete "board" and substitute ---broad---.

In Column 8, line 4, after "conduit" insert "and".

Signed and Sealed this

Sixteenth Day of July, 1991

Attest:

HARRY F. MANBECK, JR.

Attesting Officer     Commissioner of Patents and Trademarks